(12) United States Patent
Satpathy et al.

(10) Patent No.: US 10,498,532 B2
(45) Date of Patent: Dec. 3, 2019

(54) PARALLEL COMPUTATION TECHNIQUES FOR ACCELERATED CRYPTOGRAPHIC CAPABILITIES

(71) Applicant: INTEL CORPORATION, Santa Clara, CA (US)

(72) Inventors: Sudhir K. Satpathy, Hillsboro, OR (US); Raghavan Kumar, Hillsboro, OR (US); Sanu K. Mathew, Hillsboro, OR (US); Vikram B. Suresh, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 268 days.

(21) Appl. No.: 15/283,323

(22) Filed: Oct. 1, 2016

(65) Prior Publication Data
US 2018/0097625 A1  Apr. 5, 2018

(51) Int. Cl.
*G06F 21/00* (2013.01)
*H04L 9/30* (2006.01)
*G09C 1/00* (2006.01)
*G06F 7/72* (2006.01)

(52) U.S. Cl.
CPC .......... *H04L 9/302* (2013.01); *G09C 1/00* (2013.01); *G06F 7/728* (2013.01); *H04L 2209/125* (2013.01)

(58) Field of Classification Search
None
See application file for complete search history.

(56) References Cited

U.S. PATENT DOCUMENTS

| | | | | |
|---|---|---|---|---|
| 5,321,752 | A * | 6/1994 | Iwamura | G06F 7/722 380/28 |
| 6,397,241 | B1 * | 5/2002 | Glaser | G06F 7/722 708/625 |
| 6,925,563 | B1 * | 8/2005 | Jennings | H04L 9/0894 708/491 |

(Continued)

OTHER PUBLICATIONS

Freking, William L.; Parhi, Keshab K. Montgomery Modular Multiplication and Exponentiation in the Residue Number System. Conference Record of the Thirty-Third Asilomar Conference on Signals, Systems, and Computers. https://ieeexplore.ieee.org/stamp/stamp.jsp?tp=&arnumber=831919 (Year: 1999).*

(Continued)

*Primary Examiner* — Jeremiah L Avery

(57) ABSTRACT

Computing devices and techniques for performing modular exponentiation for a data encryption process are described. In one embodiment, for example, an apparatus may include at least one memory logic for an encryption unit to perform encryption according to RSA encryption using a parallel reduction multiplier (PRM) MM process, at least a portion of the logic comprised in hardware coupled to the at least one memory and the at least one wireless transmitter, the logic to precompute a reduction coefficient, determine an operand product and a reduction product in parallel, the reduction product based on the reduction coefficient, and generate a MM result for the PRM MM process based on the operand product and the reduction product. Other embodiments are described and claimed.

19 Claims, 9 Drawing Sheets

(56) References Cited

U.S. PATENT DOCUMENTS

| | | | |
|---|---|---|---|
| 7,240,204 B1* | 7/2007 | Koc | G06F 7/724 |
| | | | 708/492 |
| 2003/0206628 A1* | 11/2003 | Gura | G06F 7/724 |
| | | | 380/28 |
| 2003/0206629 A1* | 11/2003 | Eberle | G06F 7/724 |
| | | | 380/30 |
| 2004/0193880 A1* | 9/2004 | Walmsley | B41J 2/04505 |
| | | | 713/168 |
| 2004/0225881 A1* | 11/2004 | Walmsley | B41J 2/04505 |
| | | | 713/161 |
| 2005/0188218 A1* | 8/2005 | Walmsley | B41J 2/04505 |
| | | | 726/22 |
| 2006/0285682 A1* | 12/2006 | Sarangarajan | H04L 9/003 |
| | | | 380/28 |
| 2008/0025502 A1* | 1/2008 | Kounavis | G06F 7/722 |
| | | | 380/30 |
| 2009/0067619 A1* | 3/2009 | Eberle | G06F 7/724 |
| | | | 380/28 |
| 2009/0136022 A1* | 5/2009 | Langendoerfer | G06F 7/5324 |
| | | | 380/28 |
| 2011/0231467 A1* | 9/2011 | Ahn | G06F 7/728 |
| | | | 708/491 |
| 2012/0213360 A1* | 8/2012 | Le Quere | G06F 9/3877 |
| | | | 380/28 |

OTHER PUBLICATIONS

Miyamoto, Atsushi et al. Systematic Design of RSA Processors Based on High-Radix Montgomery Multipliers. IEEE Transactions on Very Large Scale Integration (VLSI) Systems, vol. 19, Issue: 7. https://ieeexplore.ieee.org/stamp/stamp.jsp?tp=&arnumber=5497217 (Year: 2011).*

Ibrahim, Atef et al. High-performance, low-power architecture for scalable radix 2 montgomery modular multiplication algorithm. Canadian Journal of Electrical and Computer Engineering, vol. 34, Issue: 4. https://ieeexplore.ieee.org/stamp/stamp.jsp?tp=&arnumber=5599422 (Year: 2009).*

Montgomery, Peter L., "Modular Multiplication Without Trial Division", Mathematics of Computation, vol. 44, pp. 519-521, 1985.

Kak, Avi, "Lecture 12: Public-Key Cryptography and the RSA Algorithm; Lecture Notes on Computer and Network Security", Purdue University, Feb. 28, 2016, 103 pages.

* cited by examiner

US 10,498,532 B2

PARALLEL COMPUTATION TECHNIQUES FOR ACCELERATED CRYPTOGRAPHIC CAPABILITIES

TECHNICAL FIELD

Embodiments herein generally relate to information processing, and more particularly, to the security in information processing systems

BACKGROUND

Public and private data centers are increasingly being used for secure communications, data operations, and data storage. As more public and private parties have relied upon these data centers, the amount of data that needs to be securely managed has rapidly increased. Data compression and encryption are used to efficiently and securely store data, such as the Rivest, Shamir, Adelman (RSA) algorithm. However, compression and encryption operations may negatively impact data center performance, especially when used in conjunction with a rapid increase in data. Several techniques have been developed to improve the performance of compression and encryption of data, such as the use of techniques to accelerate various intensive RSA computations. For example, Montgomery multiplication (MM) may be used to accelerate the determination of modular exponential steps of RSA. However, more efficient compression and encryption techniques may provide enhanced performance and scalability in rapidly growing data centers.

DETAILED DESCRIPTION

Figure 1:
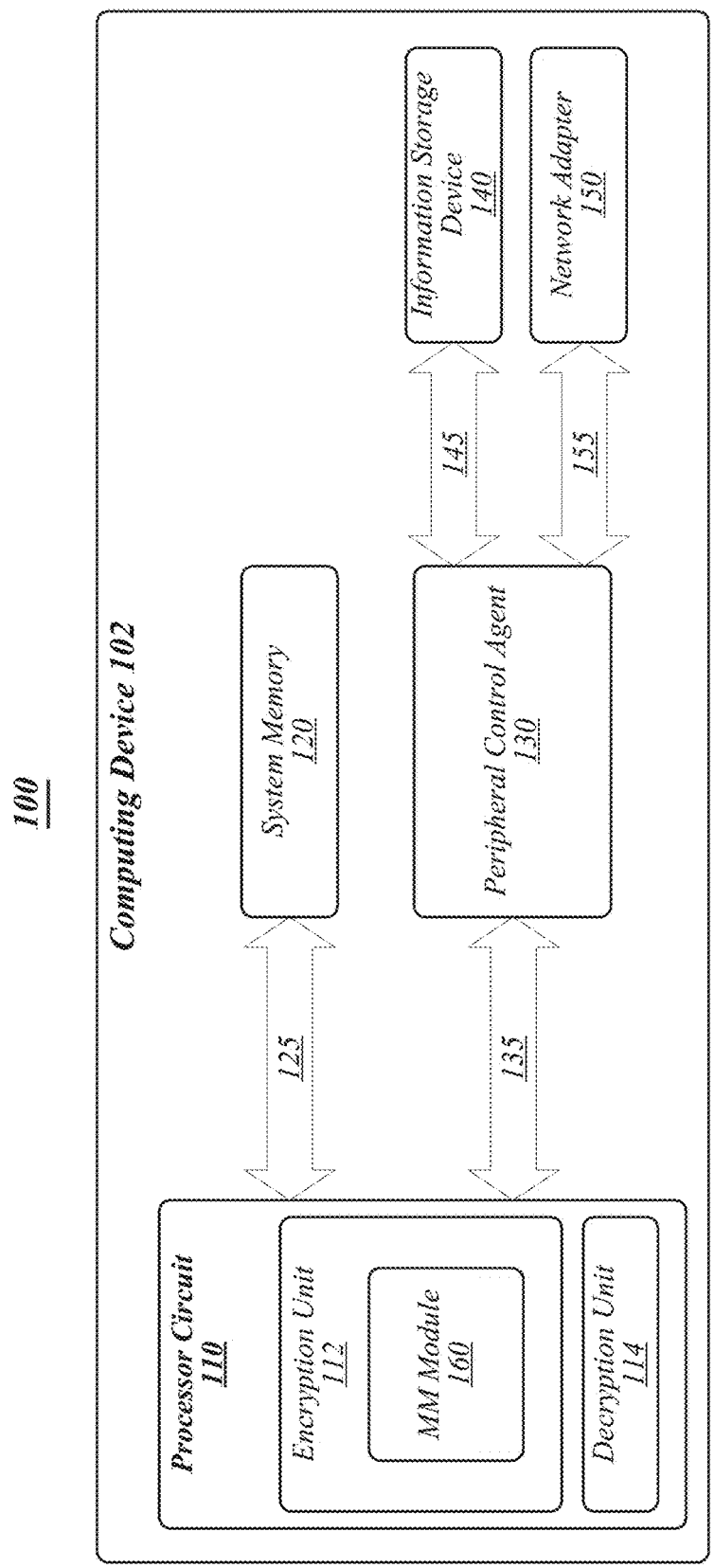
FIG. 1 illustrates an embodiment of a first operating environment.

Various embodiments may be generally directed to techniques for performing data encryption processes. In some embodiments, the data encryption processes may include public-key cryptosystems operative to provide secure data transmission. In some embodiments, an encryption process may include a Rivest, Shamir, Adelman (RSA) encryption process, such as an RSA 4096 process (RSA-4096 encryption). In some embodiments, the RSA encryption process may include Montgomery multiplication (MM) used to accelerate the determination of modular exponential steps of RSA. In some embodiments, the RSA encryption process may include a BKM implementation of MM. In some embodiments, the RSA encryption process may include an MM data path that incorporates look-ahead reduction (or scaling or Montgomery) coefficient computation operative to, for example, remove serial dependency of products to enable concurrent partial product accumulation and/or modulus reduction. In one embodiment, for example, an apparatus may include logic for an encryption unit coupled to the at least one memory, the logic to precompute a reduction coefficient, determine an operand product and a reduction product in parallel, the reduction product based on the reduction coefficient, and generate a Montgomery multiplication (MM) result for a parallel reduction multiplier (PRM) MM process based on the operand product and the reduction product.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

RSA may be used as a public-key cryptosystem for secure data transmission. Many cryptographic operations, such as RSA, may rely on one or more modular exponentiations. A modular exponentiation may include operations to determine a value for ax mod m for input values a, x, and m. In various techniques, a "windowed" exponentiation process may be performed based on a "window size" value w. In such a w-ary modular exponentiation, a loop may iterate through exponent bits in groups of w bits during calculation of an exponentiation result.

Montgomery multiplication (MM) is a common technique to accelerate the computationally intensive modular exponentiation step of RSA. In some embodiments, an MM process may be configured to generate a result according to or substantially according to the algorithm is described in "Modular Multiplication Without Trial Division", Peter Montgomery, Mathematics of Computation, vol. 44, pp. 519-521, 1985. In some embodiments, MM may include or may substantially include the process $R=(X*Y*2^{-n})$ mod M or one or more variations thereof, where n is typically the length of the modulus and R, X, Y, and M are n bit numbers. In some embodiments, an MM process may be a BKM implementation of MM. The BKM implementation of MM accelerator may operate on 2 k-bit operands in two serial loops. The first serial loop accumulates the operands' partial products, while the subsequent loop reduces the result through addition of scaled modulus in a 32b (bit or bits) data path. However, the dependency of a reduction (or scaling or Montgomery) coefficient on the least significant word of the partial product in MM approaches limits RSA throughput and is a key bottleneck for scaling to 4 k-bit operands.

FIG. 1 illustrates an example of an operating environment 100 that may be representative of various embodiments. The operating environment 100 depicted in FIG. 1 may include a computing device 102 in which information may be encrypted and decrypted according to an embodiment of the present invention. Computing device 102 may represent any type of information processing system, such as a server, a desktop computer, a portable computer, a set-top box, a hand-held device such as a tablet or a smart phone, or an embedded control system. Computing device 102 includes processor circuit 110, system memory 120, peripheral control agent 130, information storage device 140, and network adapter 150. Systems embodying the present invention may include any number of each of these components and any other peripherals, input/output devices, or other components.

Processor circuit 110 may represent one or more processors integrated on a single substrate or packaged within a single package, each of which may include multiple threads and/or multiple execution cores, in any combination. Each processor represented as or in processor circuit 110 may be any type of processor or multiple processors, including a general purpose microprocessor, such as a processor in the Intel® Core® Processor Family, Intel® Atom® Processor Family, or other processor family from Intel® Corporation, or another processor from another company, or a special purpose processor or microcontroller.

System memory 120 may represent dynamic random access memory or another type of medium readable by processor circuit 110. Peripheral control agent 130 may represent any component including or through which peripheral, input/output, or other components or devices may be connected or coupled to processor circuit 110, such as a chipset. Information storage device 140 may represent any type of persistent or non-volatile memory or storage, such as a flash memory and/or a solid state, magnetic, or optical disk drive. Network adapter 150 may represent any adapter or other device through which system 100 may be connected to and/or transfer data through a wired or wireless network including, for example, one or more transceivers.

Although FIG. 1 depicts processor 110 connected to system memory 120 through interface 125 and to peripheral control agent 130 through interface 135, and peripheral control agent 130 connected to information storage device 140 through interface 145 and to network adapter 150 through interface 155, any or all of the components or other elements in this or any system embodiment may be connected, coupled, or otherwise in communication with each other through any number of buses, point-to-point, or other wired or wireless interfaces or connections, unless specified otherwise. Furthermore, any components or other portions of system 100, whether shown in FIG. 1 or not shown in FIG. 1, may be integrated or otherwise included on or in a single chip (a system-on-a-chip or SOC), die, substrate, or package.

Returning to processor circuit 110, encryption unit 112 may represent circuitry or other hardware to encrypt data according to some embodiments, and decryption unit 114 may represent circuitry or other hardware to decrypt data according to an embodiment of the present invention. Encryption unit 112 and decryption unit 114 may each include dedicated circuitry, registers, and other hardware and/or circuitry, registers, and other hardware shared between encryption unit 112 and decryption unit 114 and/or any other unit in processor circuit 110.

Embodiments may provide for encrypting information to be stored in system memory 120 and/or information storage device 140, stored and/or used by peripheral control agent 130, transmitted by peripheral control agent 130 and/or network adapter 150 and/or through any of interfaces 125, 135, 145, and 155, and/or for any other use, storage, or transmission.

As shown in FIG. 1, encryption unit may include a Montgomery multiplication (MM) module 160 for performing MM processes during and encryption process according to some embodiments. MM module 160 may include hardware and/or software for performing MM processes according to some embodiments.

Figure 2:
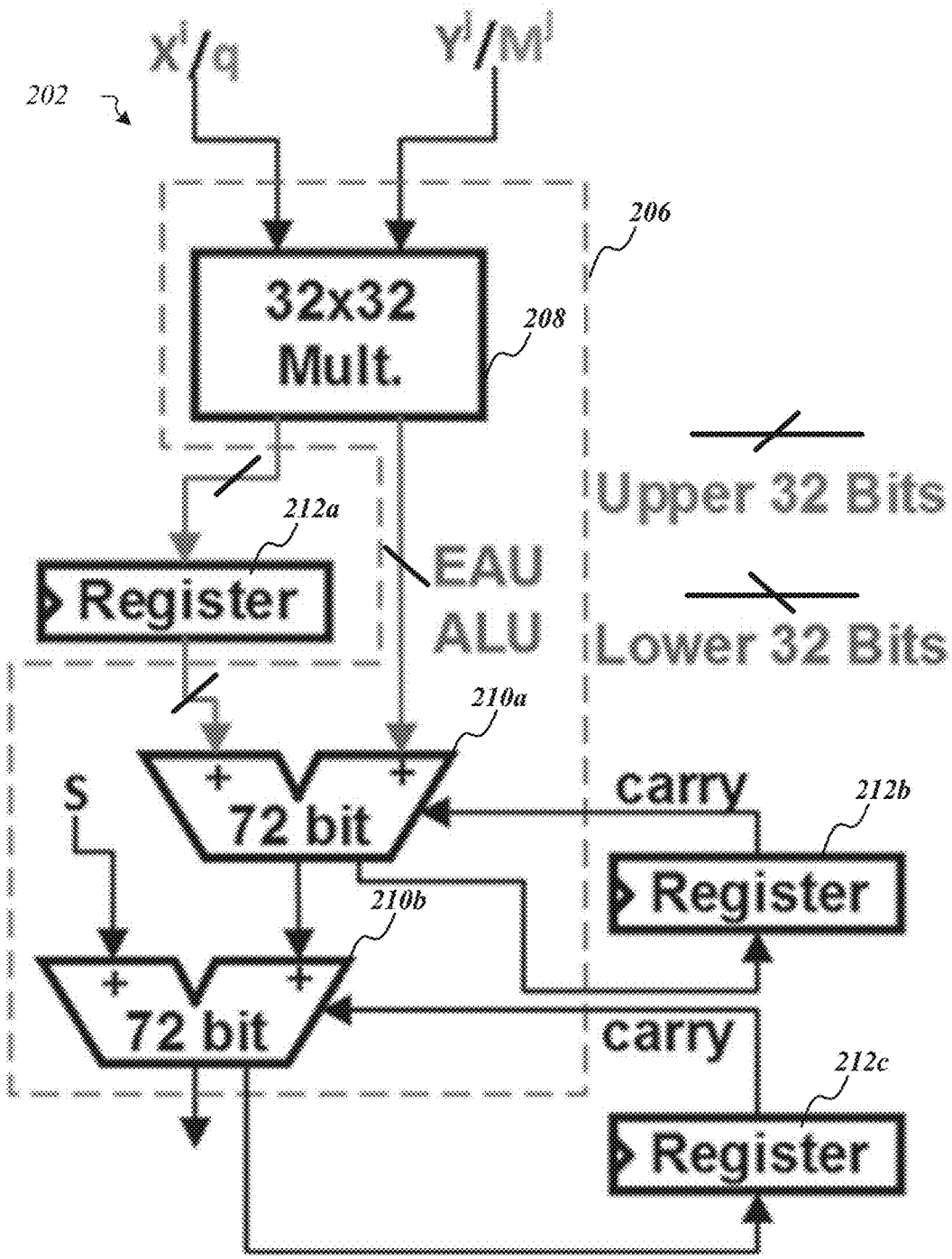
FIG. 2 depicts a Montgomery multiplication (MM) data path for an MM process.

FIG. 2 depicts a MM data path for a MM process. As shown in FIG. 2, the MM data path 202 for an MM process may include a 32b multiplier 208, 72b adders 210a and 210b, and a plurality of registers 212a-c for holding various values. A critical path 206 may consist of 32b multiplier 208 and 72b adders 210a and 210b.

The following provides a pseudo-code implementation of a MM process according to techniques ("MM process") that may be executed on the MM process data path 202 architecture depicted in FIG. 2:

$S = 0$
for $i = 0$ to 127
   for $j = 0$ to 128
      $\{C[32:0], S^j\} = x^i[31:0] * Y^j + S^j + C[32:0]$
   $q = S^0[31:0] * (2^{32} - M_{INV}^0)$
   for $j = 0$ to 128
      $\{C[32:0], S^j\} = S^j + q[31:0] * M^j + C[32:0]$
      $S^{j-1} = S^j[32:0.]$, where key length(n)=4096, radix=$2^{32}$, and MM half word (HW) length—32.

A MM process may include 2048b operands with a 32b processing engine. The first sequential loop computes the partial product for a given word of X' multiplied over all words of $Y^j$ (j=0, 1, . . . 63), with the results stored in the intermediate result $S^{63}$, $S^{62}$, . . . , $S^0$. The next sequential loop reduces the intermediate result with addition of the scaled modulus.

As illustrated by the MM process above and FIG. 2, MM processes according to conventional techniques may compute X*Y (for example, an operand product) and q*M (for example, a reduction product) serially, significantly limiting output. The dependency of the scaling (or reduction or Montgomery) coefficient q on the intermediate result in MM processes limits system throughput during an encryption process. Accordingly, embodiments provide for a MM process that eliminates the dependency between the two sequential loops with q precomputation, allowing computations within these two loops to proceed concurrently to improve throughput. For example, embodiments include a MM data path that incorporates look-ahead scaling coefficient computation, thereby breaking the serial dependency to enable concurrent partial product accumulation and modulus reduction.

Figure 3:
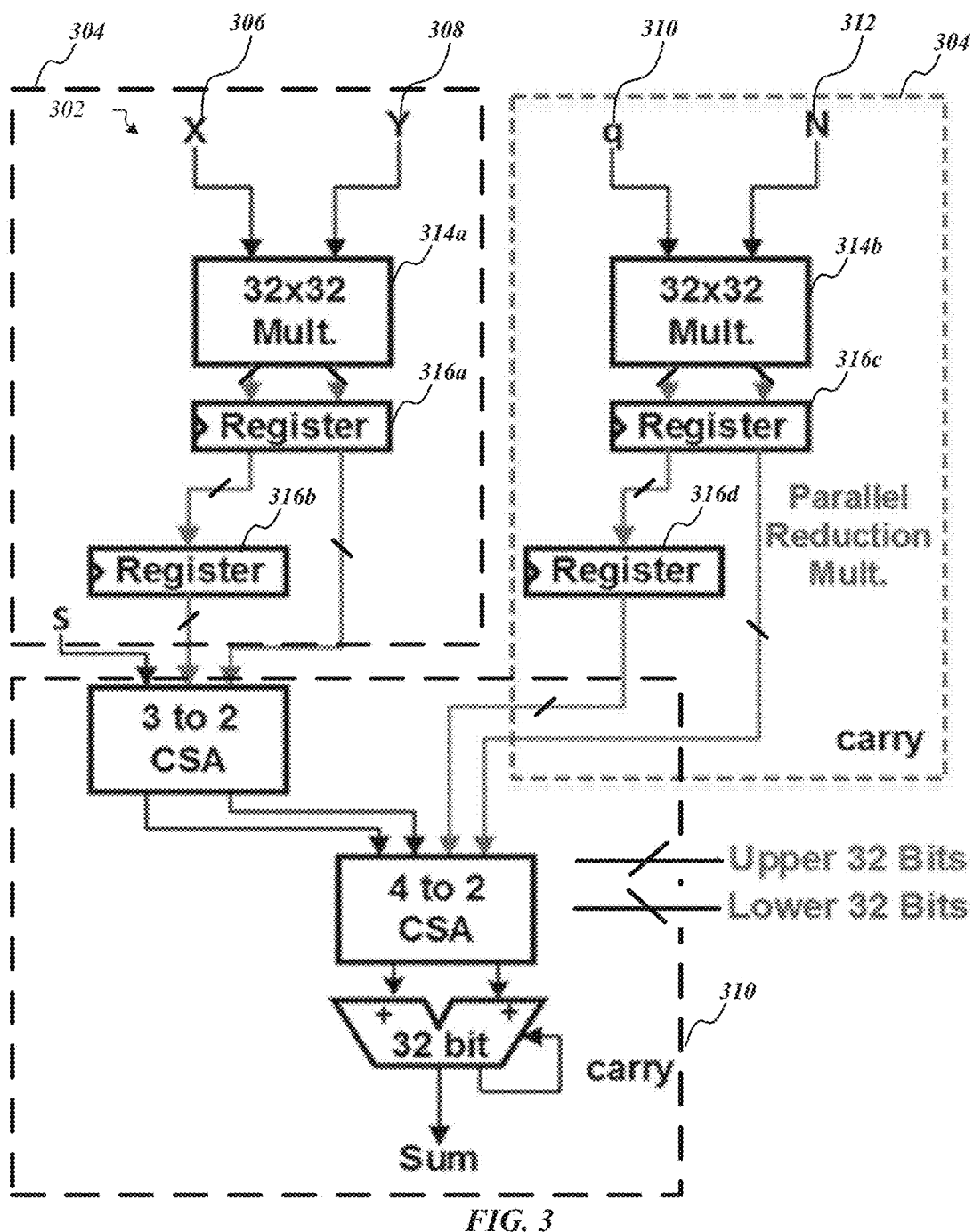
FIG. 3 illustrates an embodiment of a second operating environment.

FIG. 3 illustrates an example of an operating environment 300 that may be representative of various embodiments. As shown in FIG. 3, a PRM MM data path 302 may include hardware architecture for executing a PRM MM process according to some embodiments. The following provides a pseudo-code implementation of a parallel reduction multiplier (PRM) MM process according to some embodiments (a "PRM MM process") that may be executed by the PRM MM data path 302 architecture:

$S = 0$
compute initial q
for $i = 0$ to 127
   for $j = 0$ to 128
      $\{C[32:0], S^j\} = x^i[31:0] * Y^j + S^j + C[32:0]$ $\{C[32:0], S^j\} = S^j + q[31:0] * M^j + C[32:0]$
$S^{j-1} = S^j[32:0].]$
Precompute next $q = S^0[31:0] * (2^{32} - M_{INV}^0)$, where key length(n)=4096, radix=$2^{32}$, and MM half word (HW) length=32.

In some embodiments, PRM MM data path may include two PRMs 304, each of which may include a multiplier 314a or 314b and registers 316a and 316b or 316c and 316d, respectively. Each PRM 304 may be configured to perform parallel multiplication processes. For example, one PRM 304 may operate to generate an operand product of X*Y while PRM, while another PRM 304 may operate to generate a reduction product of q*N (or M or modulus). In various embodiments, the PRM MM process may receive operands X 306 and Y 308, coefficient q (for example, reduction, scaling, or Montgomery coefficient) 310, and N 312 parameters. Multipliers 314a and 314b may be configured to determine X*Y (for example, an operand product) and q*N (or M or modulus) (for example, a reduction product) concurrently. The two multipliers 314a and 314b may include 32×32 word multipliers each operative to perform 32×1024 bit multiplication (for example, both X*Y and q*M) in 32 cycles. A subsequent pipeline stage (for instance, a post-PRM stage) 310 may operate to merge 5 32 bit outputs to generate corresponding words of result S. The PRM MM process according to some embodiments allows for pipelining the processing element (PE) so that multiply and accumulate processes may be executed in different cycles for higher operating frequency. In some embodiments, MM module 160 may include, operate, control, or otherwise interact with PRM MM data path 302.

Figure 4:
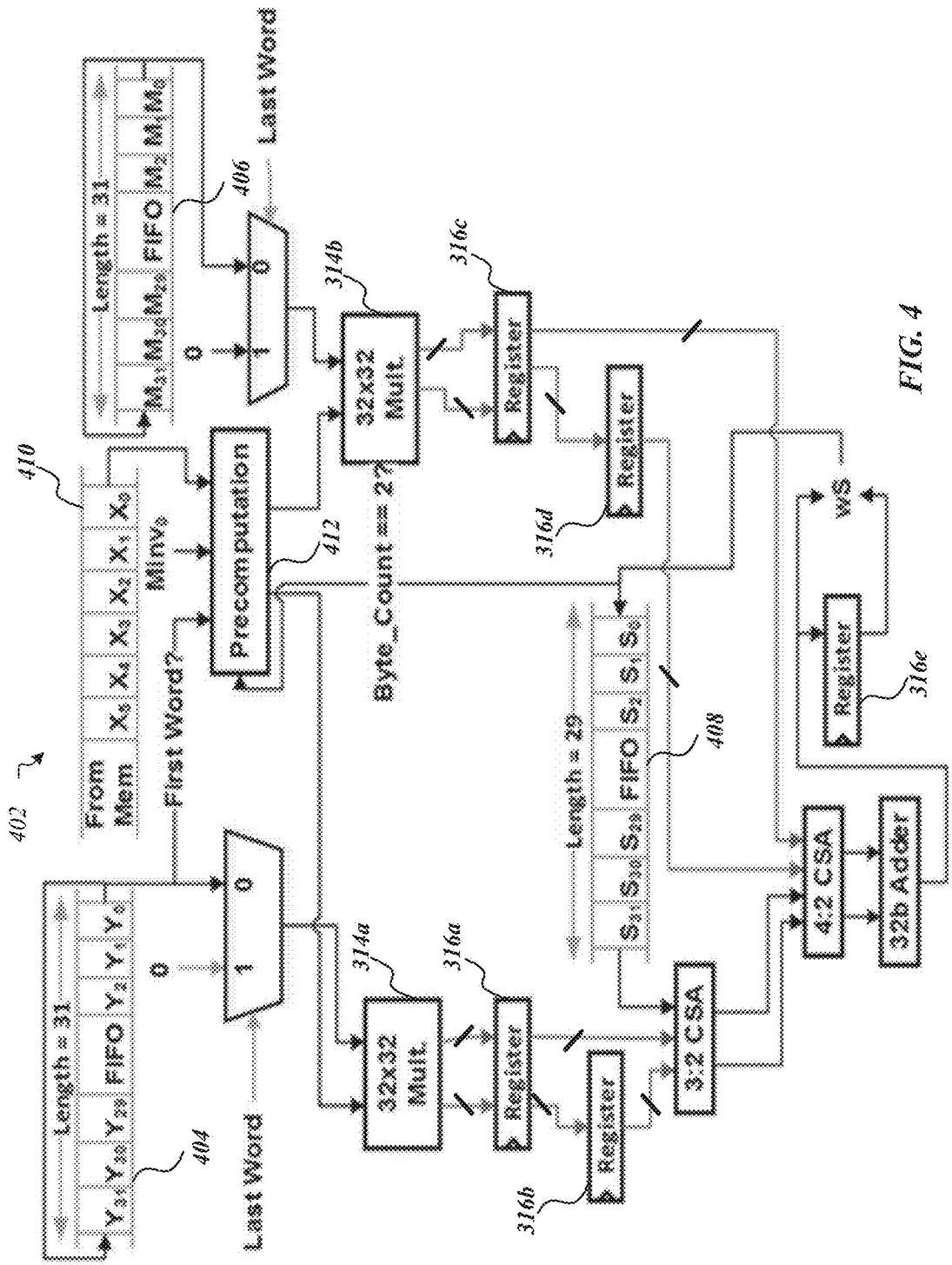
FIG. 4 illustrates an embodiment of a third operating environment.

FIG. 4 illustrates an example of an operating environment 400 that may be representative of various embodiments. More specifically, FIG. 4 depicts PRM MM data path 402 that includes a detailed view of PRM MM data path 302 of FIG. 3. PRM MM data path 402 may include hardware architecture for performing a PRM MM process according to some embodiments. In some embodiments, MM module 160 may include, operate, control, or otherwise interact with PRM MM data path 402.

As shown in FIG. 4, PRM MM data path 402 may receive Y, M, and S from FIFO elements 404, 406, and 408, respectively and X from memory element 410. In some embodiments, a PRM MM process may include a precomputation block 412 for precomputation of q for a subsequent round of X. In some embodiments, precomputation of q may include fetching $X^i$ (w−2) for example, w=32 for a word based data path) cycles before the $i^{th}$ iteration (for instance, outer loop) starts. In various embodiments, $S^0$ from the $(i-1)^{th}$ iteration may be loaded into the precompute block 412. In some embodiments, the precompute block 412 may perform a 32×32 multiplication, the result of which is needed after w−3 cycles. In some embodiments, precompute block 412 may operate using a serial low-area/power multiplier. Precomputation block 412 of PRM MM data path 402 may precompute reduction coefficient q based on intermediate results from a previous iteration of the PRM MM process. The precomputation block 412 may operate to access the lowermost word of the intermediate results of a previous PRM MM cycle to determine the reduction coefficient q for a current or subsequent cycle.

When a slow serial multiplier is used in the q precomputation block 412, there may be a delay (for example, a number of cycles taken by precomputation block 412 to generate a result) before the iteration of $X^0$ can start (for instance, precomputation block 412 may be finding $q^0$). Accordingly, a latency of a certain number of cycles (for example, 3 cycles for w=32) may be incurred once and may account for a minimal overhead (for instance, about less than 3%) of the PRM MM process. Accordingly, in some embodiments, FIFO elements 404, 406, and 408 may be used to avoid such overhead. The FIFO elements 404, 406, and 408 may be used for concurrent operand loading and q pre-computation according to some embodiments. In various embodiments in which PRM MM data path 402 includes a FIFO-based architecture (for example, Y, M, and S are stored in FIFO 404, 406, and 408, respectively, and X is stored in memory 410), while the Y FIFO 404 is loaded with words of Y (for example, serially loaded), the precomputation process performed by precomputation block 412 may start in parallel. Accordingly, the total number of cycles may be 32 (for example, initial FIFO 404, 406, and 408 load)+ 33*32=1088 for the PRM MM step.

Figure 5:
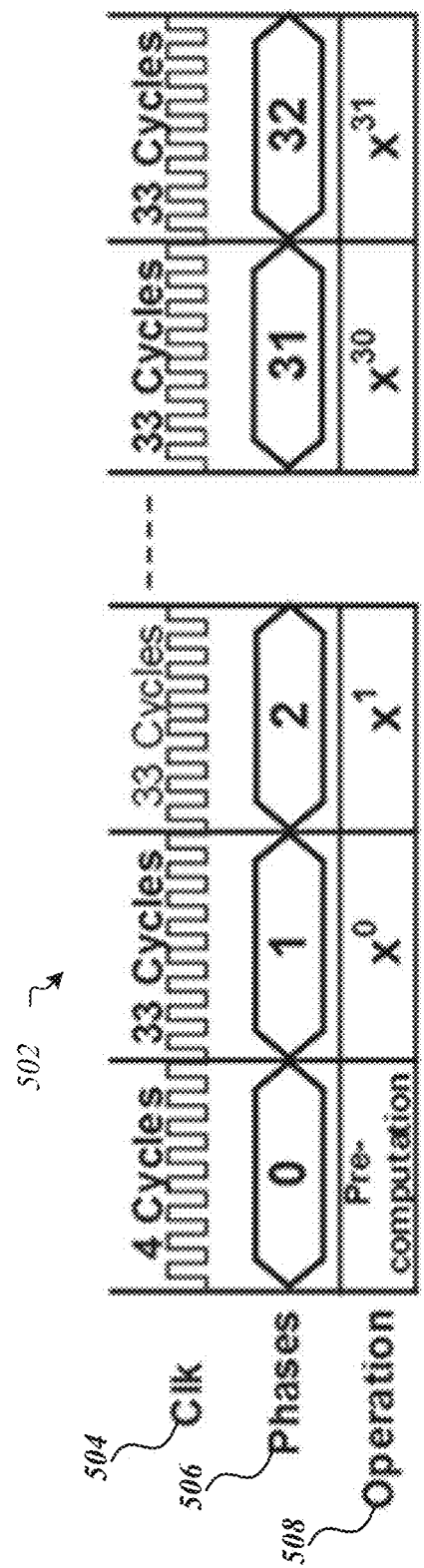
FIG. 5 depicts a first timing diagram for a parallel reduction multiplier (PRM) MM process according to some embodiments.

FIG. 5 depicts an illustrative timing diagram 502 for operations performed by a PRM MM process and architecture according to some embodiments. For example, timing diagram 502 may depict clock cycles 504, phases 506, and operations 508 that occur during a PRM MM process according to some embodiments, such as a PRM MM process executed by PRM MM data path 302 and/or PRM MM data path 402. As shown in FIG. 5, each operation 508 may require a certain number of clock cycles 504. For example, pre-computation may require 4 cycles, while $x^0, \ldots, x^{31}$ may require 33 cycles.

Figure 6:
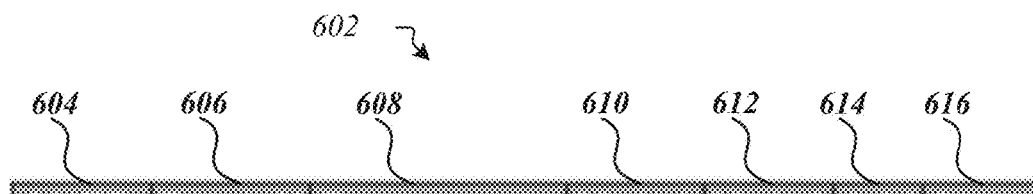
FIG. 6 depicts precomputation of a reduction coefficient for a PRM MM process according to some embodiments

FIG. 6 depicts precomputation of scaling coefficient q for a PRM MM process according to some embodiments in Table 602 along with corresponding dependencies counter 604, fetch X 606, precompute 608, multiplier 1 610, multiplier 2 612, add 614, and store 616. In some embodiments, the reduction coefficient may update only during certain cycles of the PRM MM process. For example, in various embodiments, the reduction coefficient may once in b/r cycles (b=bit-width of operands, r=radix of MM, 32 cycles for 1024b operands with r=32). Accordingly, as depicted in FIG. 6, $q^1$ may be idle until $q^2$ needs to be determined. In some embodiments, multiplier 1 610 may correspond to values that may be processed by multiplier 314a of FIGS. 3 and 4 and multiplier 2 612 may correspond to values that may be processed by multiplier 314b of FIGS. 3 and 4. In some embodiments, the reduction coefficient q may be initialized to $q^0$, for example, at the start of a PRM MM process. An updated reduction coefficient $q^1, q^2, \ldots, q^n$, may be determined based on $S^1$ from Add 614 via precomputation block 412.

Figure 7:
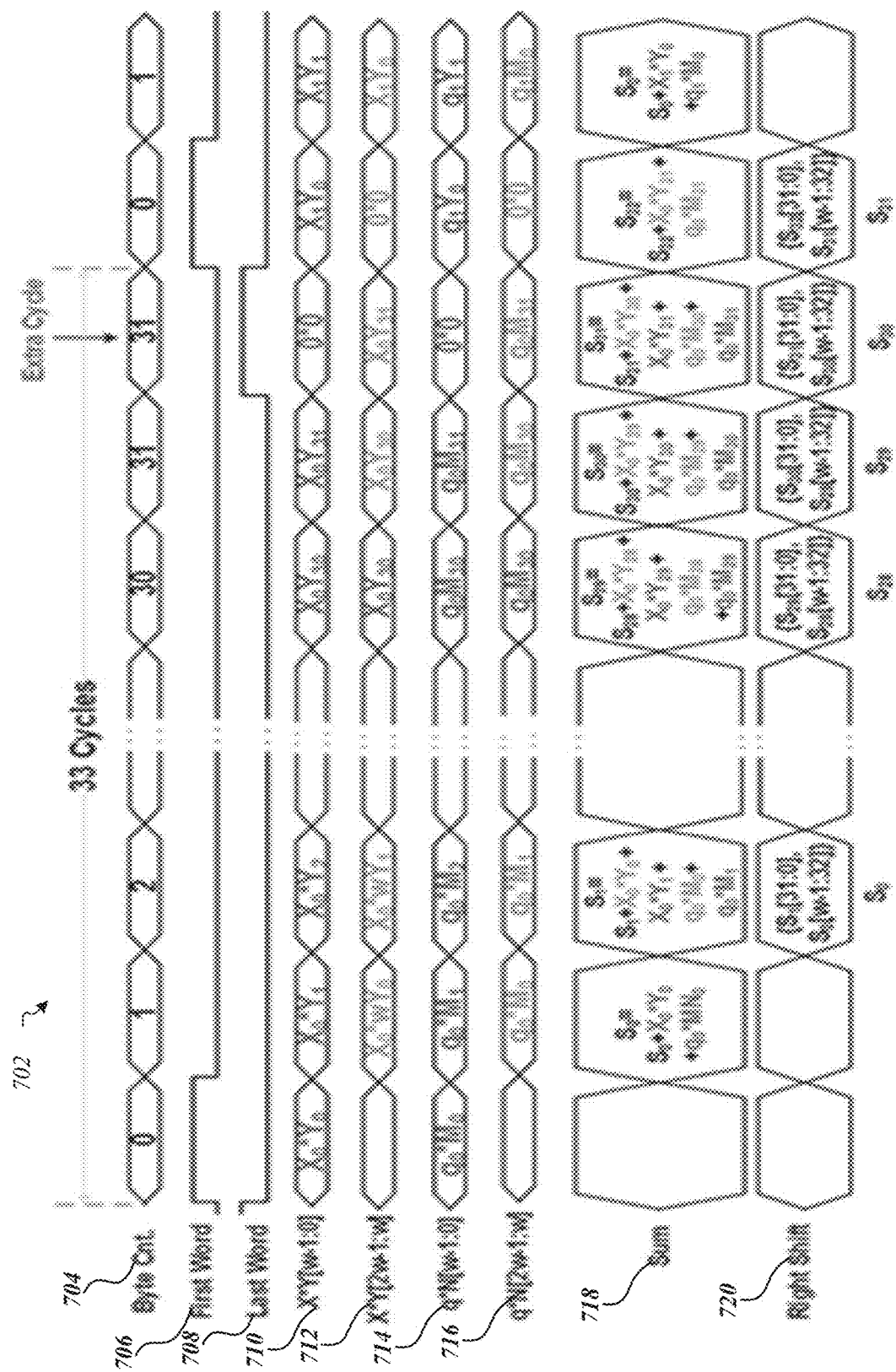
FIG. 7 depicts a second timing diagram for a parallel reduction multiplier (PRM) MM process according to some embodiments.

FIG. 7 depicts a timing diagram 702 for a PRM MM process according to some embodiments for a byte counter 704, a first word 706, a last word 708, X*Y[w−1:0] 710, X*Y[2 w−1:2] 712, q*N[w−1:0] 714, q*N[2 w−1:2] 716, sum 718, and right shift 720. In some embodiments, the timing diagram 702 may include operations performed during a PRM MM process executed on PRM MM data path 302 and/or PRM MM data path 402. In some embodiments, the sum(s) 718 may be used by the encryption unit 112 to perform RSA encryption.

In each step of an MM process, the intermediate result is added with a multiple (q) of modulus (M) to make the last r bits of the result 0, $2^r$ being the radix of the MM. Determination of the reduction coefficient q depends on the intermediate result, thus requiring the two operations to be executed serially. MM hardware accelerators are based on a reduced data path (for example, 32b) processing element to support different operand lengths at lower area. Accordingly, in some embodiments, early availability of the lowermost word of the intermediate result allows computation of the subsequent reduction coefficient for the next round of partial product accumulation in concurrent with computation of higher order words for the current intermediate result. This breaks the aforementioned serial dependency and allows parallel reduction of the intermediate result improving throughput.

In some embodiments, a parallel reduction multiplier concurrently computes the word-by-word multiplication of modulus with the reduction coefficient in parallel to word-by-word multiplication of the operands, and selectively accumulates the lower order partial products of current step with higher order ones of previous step. This allows replacement of 64b adders in the critical-path with 32b adders improving operating frequency.

Usage of a reduced data path serial multiplier (4b) for reduction coefficient computation enables 60% area saving over a traditional 32b multiplier implementation without impacting throughput. In addition, PRM MM processes according to some embodiments may facilitate RSA 4096 with 90K MM (for example, MontgomeryMults/S) providing, for example, a 3.7 fold throughput improvement with 43% higher energy-efficiency over MM processes (for instance, BKM implementations of MM).

Included herein is a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 8:
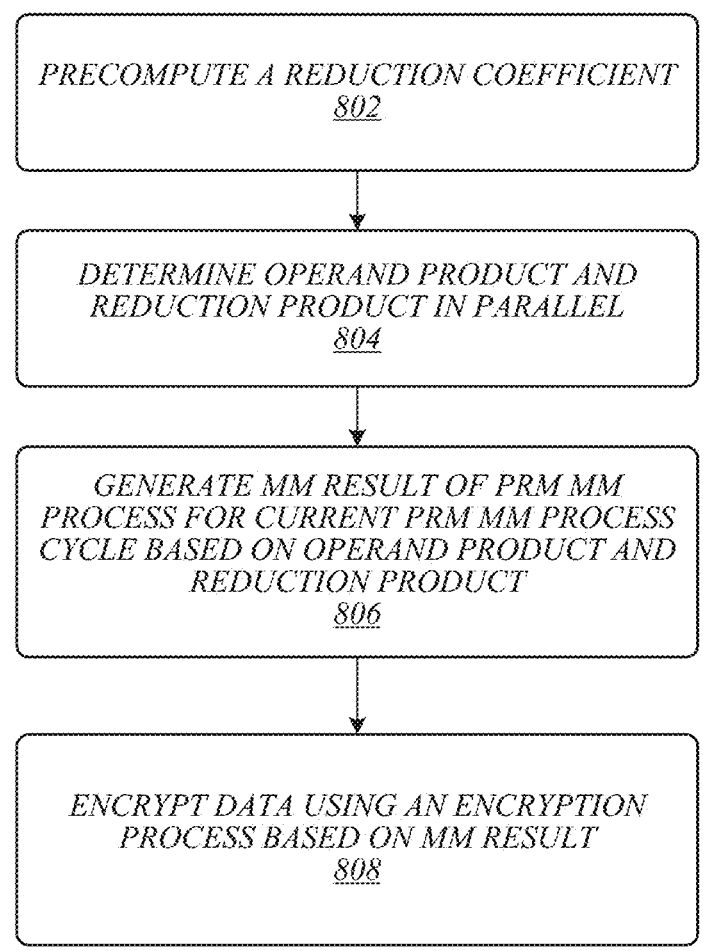
FIG. 8 illustrates an embodiment of a first logic flow.

FIG. 8 illustrates an embodiment of a logic flow 800. The logic flow 800 may be representative of some or all of the operations executed by one or more embodiments described herein, such as one of computing device 102, PRM MM data path 302, and/or PRM MM data path 402.

In the illustrated embodiment shown in FIG. 8, the logic flow 800 at block 802 may precompute a reduction coefficient. For example, precomputation block 412 of PRM MM data path 402 may precompute reduction coefficient q based on intermediate results from a previous iteration of the PRM MM process. The precomputation block 412 may operate to access the lowermost word of the intermediate results of a previous PRM MM cycle to determine the reduction coefficient q for a current or subsequent cycle. In some embodiments, the reduction coefficient q may be updated every PRM MM process cycle. In some embodiments, the reduction coefficient q may be updated every b/r cycles, where b=bit-width of operands and r=MM radix. At block 804, logic flow 800 may determine an operand product and a reduction product in parallel. For example, PRM MM data path 402 may use two multipliers 314a and 314b to determine an operand product of X*Y and a reduction product of q*M in parallel. In some embodiments, determining the operand product and the reduction product in parallel may include determining these values during the same iteration of the same loop of a PRM MM process. In some embodiments, determining the operand product and the reduction product in parallel may include determining these values at the same or substantially the same time during a PRM MM process. Logic flow 800 may determine a result of the PRM MM process at block 806. For example, PRM MM data path 402 may use the operand product and the reduction product to determine an MM result of a current cycle of the PRM MM process, for instance, to determine $R=(X*Y*2^{-n})$ mod N or one or more variations thereof. At block 808, logic flow 800 may operate to encrypt data using the MM result. For example, an RSA encryption process may use the MM result to encrypt data being transmitted by computing device 102.

Figure 9:
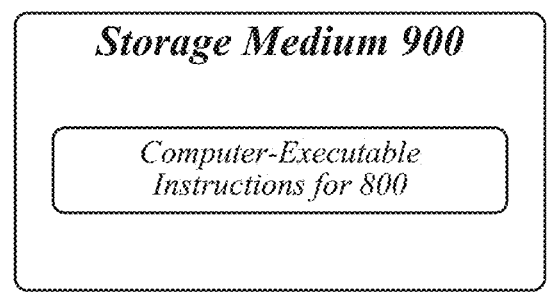
FIG. 9 illustrates an embodiment of a first storage medium.

FIG. 9 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus for parallel computation to accelerate cryptographic operations, the apparatus comprising at least one memory; logic for an encryption unit coupled to the at least one memory, the logic to precompute a reduction coefficient, determine an operand product and a reduction product in parallel, the reduction product based on the reduction coefficient, and generate a Montgomery multiplication (MM) result for a parallel reduction multiplier (PRM) MM process based on the operand product and the reduction product.

Example 2 is the apparatus of Example 1, the encryption unit to perform Rivest, Shamir, Adelman (RSA) encryption using the PRM MM process.

Example 3 is the apparatus of Example 2, the RSA encryption comprising RSA-4096 encryption.

Example 4 is the apparatus of Example 1, comprising a PRM MM data path, at least a portion of the PRM MM data path comprised in hardware, coupled to the logic.

Example 5 is the apparatus of Example 4, the PRM MM data path comprising a word-based data path.

Example 6 is the apparatus of Example 4, the PRM MM data path comprising a 32 bit word-based data path.

Example 7 is the apparatus of Example 4, the PRM MM data path comprising a first multiplier and a second multiplier for determining the operand product and the reduction product in parallel.

Example 8 is the apparatus of Example 7, the first multiplier and the second multiplier comprising 32×32 word multipliers.

Example 9 is the apparatus of Example 7, the first multiplier to determine the operand product and the second multiplier to determine the reduction product.

Example 10 is the apparatus of Example 4, the PRM MM data path comprising a precomputation block to precompute the reduction coefficient.

Example 11 is the apparatus of Example 4, the PRM MM data path comprising at least one 32 bit adder to determine the MM result.

Example 12 is the apparatus of Example 1, the logic to precompute the reduction coefficient based on an intermediate MM result of a previous cycle of the PRM MM process.

Example 13 is the apparatus of Example 1, the logic to accumulate lower order partial products of a current cycle of the PRM MM process with higher order partial products of a previous cycle of the PRM MM process.

Example 14 is the apparatus of Example 1, the logic to store MM operands in a first-in-first-out (FIFO) element.

Example 15 is the apparatus of Example 1, the logic to store a MM modulus in a first-in-first-out (FIFO) element.

Example 16 is the apparatus of Example 1, the logic to store a MM result in a first-in-first-out (FIFO) element.

Example 17 is the apparatus of Example 1, the logic to precompute the reduction coefficient for an $i^{th}$ iteration of the PRM MM process based on intermediate result S from an $i-1^{th}$ iteration of the PRM MM process.

Example 18 is the apparatus of Example 1, the logic to precompute the reduction coefficient in 4 clock cycles.

Example 19 is the apparatus of Example 1, the PRM MM process completing in 1088 cycles.

Example 20 is the apparatus of Example 1, the reduction product determined based on a lowermost word of an intermediate result of a previous cycle of the PRM MM process.

Example 21 is the apparatus of Example 1, the PRM MM process to accumulate lower-order partial products of a current cycle with higher-order products of a previous cycle.

Example 22 is the apparatus of Example 1, the logic to precompute the reduction product every b/r cycles, where b is a bit-width of MM operands and r is an MM radix.

Example 23 is the apparatus of Example 1, the PRM MM process operating using a key length(n) of 4096.

Example 24 is the apparatus of Example 1, the PRM MM process operating using a radix of $2^{32}$.

Example 25 is the apparatus of Example 1, the PRM MM process operating using a word length of 32.

Example 26 is the apparatus of Example 1, the result of the PRM MM process comprising $(X*Y*2^{-n})$ mod M, where X and Y are operands and n is a length of a modulus M.

Example 27 is the apparatus of Example 1, the PRM MM process having a pseudo-code form of:

```
S = 0
compute initial q
for i = 0 to 127
  for j = 0 to 128
    {C[32:0], S^j} = x^i[31:0] * Y^j + S^j + C[32:0]
    {C[32:0], S^j} = S^j + q[31:0] * M^j + C[32:0]
    S^{j-1} = S^j[32:0.]
    Precompute next q = S^0[31:0] * (2^{32} - M_{INV}^0),
``` where q is the reduction coefficient, X and Y are operands, M is a modulus, and S is a result of a cycle.

Example 28 is a system for parallel computation to accelerate cryptographic operations, the system comprising an apparatus according to any of Examples 1 to 27, and at least one radio frequency (RF) transceiver.

Example 29 is a computer-readable storage medium, which can be non-transitory, that stores instructions for parallel computation to accelerate cryptographic operations, the instructions for execution by processing circuitry of a computing device to perform an encryption process, the instructions to cause the computing device to precompute a reduction coefficient, determine an operand product and a reduction product in parallel, the reduction product based on the reduction coefficient, and generate a Montgomery multiplication (MM) result for a parallel reduction multiplier (PRM) MM process based on the operand product and the reduction product.

Example 30 is the computer-readable storage medium of Example 29, the instructions to cause the computing device to perform Rivest, Shamir, Adelman (RSA) encryption using the PRM MM process.

Example 31 is the computer-readable storage medium of Example 30, the RSA encryption comprising RSA-4096 encryption.

Example 32 is the computer-readable storage medium of Example 29, the instructions to cause the computing device to use a PRM MM data path for performing the PRM MM process.

Example 33 is the computer-readable storage medium of Example 32, the PRM MM data path comprising a word-based data path.

Example 34 is the computer-readable storage medium of Example 32, the PRM MM data path comprising a 32 bit word-based data path.

Example 35 is the computer-readable storage medium of Example 32, the PRM MM data path comprising a first multiplier and a second multiplier for determining the operand product and the reduction product in parallel.

Example 36 is the computer-readable storage medium of Example 35, the first multiplier and the second multiplier comprising 32×32 word multipliers.

Example 37 is the computer-readable storage medium of Example 35, the instructions to cause the computing device to use the first multiplier to determine the operand product and the second multiplier to determine the reduction product.

Example 38 is the computer-readable storage medium of Example 32, the instructions to cause the computing device to use a precomputation block of the PRM MM data path to precompute the reduction coefficient.

Example 39 is the computer-readable storage medium of Example 32, the PRM MM data path comprising at least one 32 bit adder to determine the MM result.

Example 40 is the computer-readable storage medium of Example 29, the instructions to cause the computing device to precompute the reduction coefficient based on an intermediate MM result of a previous cycle of the PRM MM process.

Example 41 is the computer-readable storage medium of Example 29, the instructions to cause the computing device to accumulate lower order partial products of a current cycle of the PRM MM process with higher order partial products of a previous cycle of the PRM MM process.

Example 42 is the computer-readable storage medium of Example 29, the instructions to cause the computing device to store MM operands in a first-in-first-out (FIFO) element.

Example 43 is the computer-readable storage medium of Example 29, the instructions to cause the computing device to store a MM modulus in a first-in-first-out (FIFO) element.

Example 44 is the computer-readable storage medium of Example 29, the logic to store a MM result in a first-in-first-out (FIFO) element.

Example 45 is the computer-readable storage medium of Example 29, the instructions to cause the computing device to precompute the reduction coefficient for an $i^{th}$ iteration of the PRM MM process based on intermediate result S from an $i-1^{th}$ iteration of the PRM MM process.

Example 46 is the computer-readable storage medium of Example 29, the instructions to cause the computing device to precompute the reduction coefficient in 4 clock cycles.

Example 47 is the computer-readable storage medium of Example 29, the PRM MM process completing in 1088 cycles.

Example 48 is the computer-readable storage medium of Example 29, the instructions to cause the computing device to determine the reduction product based on a lowermost word of an intermediate result of a previous cycle of the PRM MM process.

Example 49 is the computer-readable storage medium of Example 29, the instructions to cause the computing device to accumulate lower-order partial products of a current cycle with higher-order products of a previous cycle.

Example 50 is the computer-readable storage medium of Example 29, the instructions to cause the computing device to precompute the reduction product every b/r cycles, where b is a bit-width of MM operands and r is an MM radix.

Example 51 is the computer-readable storage medium of Example 29, the instructions to cause the computing device to perform the PRM MM process using a key length(n) of 4096.

Example 52 is the computer-readable storage medium of Example 29, the instructions to cause the computing device to perform the PRM MM process using a radix of 232.

Example 53 is the computer-readable storage medium of Example 29, the instructions to cause the computing device to perform the PRM MM process using a word length of 32.

Example 54 is the computer-readable storage medium of Example 29, the result of the PRM MM process comprising (X*Y*2−n) mod M, where X and Y are operands and n is a length of a modulus M.

Example 55 is the computer-readable storage medium of Example 29, the instructions to cause the computing device to perform the PRM MM process having a pseudo-code form of:

```
S = 0
compute initial q
for i = 0 to 127
    for j = 0 to 128
        {C[32:0], S^j} = x^i[31:0] * Y^j + S^j + C[32:0]
        {C[32:0], S^j} = S^j + q[31:0] * M^j + C[32:0]
        S^{j-1} = S^j[32:0.]
        Precompute next q = S^0[31:0] * (2^{32} − M_{INV}^0),
``` where q is the reduction coefficient, X and Y are operands, M is a modulus, and S is a result of a cycle.

Example 56 is a method to accelerate cryptographic operations, the method comprising precomputing a reduction coefficient, determining an operand product and a reduction product in parallel, the reduction product based on the reduction coefficient, and generating a Montgomery multiplier (MM) result for a parallel reduction multiplier (PRM) MM process based on the operand product and the reduction product.

Example 57 is the method of Example 56, comprising performing Rivest, Shamir, Adelman (RSA) encryption using the PRM MM process.

Example 58 is the method of Example 57, the RSA encryption comprising RSA-4096 encryption.

Example 59 is the method of Example 56, comprising using a PRM MM data path for performing the PRM MM process.

Example 60 is the method of Example 59, the PRM MM data path comprising a word-based data path.

Example 61 is the method of Example 59, the PRM MM data path comprising a 32 bit word-based data path.

Example 62 is the method of Example 59, the PRM MM data path comprising a first multiplier and a second multiplier for determining the operand product and the reduction product in parallel.

Example 63 is the method of Example 62, the first multiplier and the second multiplier comprising 32×32 word multipliers.

Example 64 is the method of Example 62, comprising using the first multiplier to determine the operand product and the second multiplier to determine the reduction product.

Example 65 is the method of Example 59, comprising using a precomputation block of the PRM MM data path to precompute the reduction coefficient.

Example 66 is the method of Example 59, the PRM MM data path comprising at least one 32 bit adder to determine the MM result.

Example 67 is the method of Example 56, comprising precomputing the reduction coefficient based on an intermediate MM result of a previous cycle of the PRM MM process.

Example 68 is the method of Example 56, comprising accumulating lower order partial products of a current cycle of the PRM MM process with higher order partial products of a previous cycle of the PRM MM process.

Example 69 is the method of Example 56, comprising storing MM operands in a first-in-first-out (FIFO) element.

Example 70 is the method of Example 56, comprising storing a MM modulus in a first-in-first-out (FIFO) element.

Example 71 is the method of Example 56, comprising storing a MM result in a first-in-first-out (FIFO) element.

Example 72 is the method of Example 56, comprising precomputing the reduction coefficient for an ith iteration of the PRM MM process based on intermediate result S from an i−1th iteration of the PRM MM process.

Example 73 is the method of Example 56, comprising precomputing the reduction coefficient in 4 clock cycles.

Example 74 is the method of Example 56, comprising completing the PRM MM process in 1088 cycles.

Example 75 is the method of Example 56, comprising determining the reduction coefficient based on a lowermost word of an intermediate result of a previous cycle of the PRM MM process.

Example 76 is the method of Example 56, comprising accumulating lower-order partial products of a current cycle with higher-order products of a previous cycle.

Example 77 is the method of Example 56, comprising precomputing the reduction product every b/r cycles, where b is a bit-width of MM operands and r is an MM radix.

Example 78 is the method of Example 56, comprising performing the PRM MM process using a key length(n) of 4096.

Example 79 is the method of Example 56, comprising performing the PRM MM process using a radix of 232.

Example 80 is the method of Example 56, comprising performing the PRM MM process using a word length of 32.

Example 81 is the method of Example 56, the result of the PRM MM process comprising (X*Y*2−n) mod M, where X and Y are operands and n is a length of a modulus M.

Example 82 is the method of Example 56, comprising performing the PRM MM process having a pseudo-code form of:

```
S= 0
compute initial q
for i = 0 to 127
    for j = 0 to 128
        {C[32:0], S^j} = x^i[31:0] * Y^j + S^j + C[32:0]
        {C[32:0], S^j} = S^j + q[31:0] * M^j + C[32:0]
        S^{j-1} = S^j[32:0.]
    Precompute next q = S^0[31:0] * (2^{32} − M_{INV}^0),
``` where q is the reduction coefficient, X and Y are operands, M is a modulus, and S is a result of a cycle.

Example 83 is system to accelerate cryptographic operations, the system comprising at least one memory, and logic, at least a portion of which is comprised in hardware coupled to the at least one memory, the logic to perform a method according to any of claims 56-82.

Example 84 is an apparatus to accelerate cryptographic operations, the apparatus comprising a precompute means to precompute a reduction coefficient, at least one multiplier means to determine an operand product and a reduction product in parallel, the reduction product based on the reduction coefficient, and a parallel reduction multiplier (PRM) means to generate a Montgomery multiplication (MM) result for a PRM MM process based on the operand product and the reduction product.

Example 85 is the apparatus of Example 84, comprising an encryption means to perform Rivest, Shamir, Adelman (RSA) encryption using the PRM MM process.

Example 86 is the apparatus of Example 85, the RSA encryption comprising RSA-4096 encryption.

Example 87 is the apparatus of Example 84, comprising a PRM MM data path means for performing the PRM MM process.

Example 88 is the apparatus of Example 87, the PRM MM data path means comprising a word-based data path.

Example 89 is the apparatus of Example 87, the PRM MM data path means comprising a 32 bit word-based data path.

Example 90 is the apparatus of Example 87, the PRM MM data path means comprising a first multiplier and a second multiplier for determining the operand product and the reduction product in parallel.

Example 91 is the apparatus of Example 90, the first multiplier and the second multiplier comprising 32×32 word multipliers.

Example 92 is the apparatus of Example 90, the first multiplier to determine the operand product and the second multiplier to determine the reduction product.

Example 93 is the apparatus of Example 87, the PRM MM data path means comprising a precomputation block to precompute the reduction coefficient.

Example 94 is the apparatus of Example 87, the PRM MM data path means comprising at least one 32 bit adder to determine the MM result.

Example 95 is the apparatus of Example 84, the precomputation means to precompute the reduction coefficient based on an intermediate MM result of a previous cycle of the PRM MM process.

Example 96 is the apparatus of Example 84, comprising an accumulator means to accumulate lower order partial products of a current cycle of the PRM MM process with higher order partial products of a previous cycle of the PRM MM process.

Example 97 is the apparatus of Example 84, comprising storage means to store MM operands in a first-in-first-out (FIFO) element.

Example 98 is the apparatus of Example 84, comprising storage means to store a MM modulus in a first-in-first-out (FIFO) element.

Example 99 is the apparatus of Example 84, comprising storage means to store a MM result in a first-in-first-out (FIFO) element.

Example 100 is the apparatus of Example 84, the pre-computation means to precompute the reduction coefficient for an ith iteration of the PRM MM process based on intermediate result S from an i−1th iteration of the PRM MM process.

Example 101 is the apparatus of Example 84, the pre-computation means to precompute the reduction coefficient in 4 clock cycles.

Example 102 is the apparatus of Example 84, the PRM MM process completing in 1088 cycles.

Example 103 is the apparatus of Example 84, the reduction product determined based on a lowermost word of an intermediate result of a previous cycle of the PRM MM process.

Example 104 is the apparatus of Example 84, the PRM MM process to accumulate lower-order partial products of a current cycle with higher-order products of a previous cycle.

Example 105 is the apparatus of Example 84, the pre-computation means to precompute the reduction product every b/r cycles, where b is a bit-width of MM operands and r is an MM radix.

Example 106 is the apparatus of Example 84, the PRM MM process means using a key length(n) of 4096.

Example 107 is the apparatus of Example 84, the PRM MM process means using a radix of 232.

Example 108 is the apparatus of Example 84 the PRM MM process means using a word length of 32.

Example 109 is the apparatus of Example 84, the result of the PRM MM process comprising (X*Y*2−n) mod M, where X and Y are operands and n is a length of a modulus M.

Example 110 is the apparatus of Example 84, the PRM MM process means performing a PRM MM process having a pseudo-code form of:

```
S= 0
compute initial q
for i = 0 to 127
    for j = 0 to 128
        {C[32:0], Sj} = xi[31:0] * Yj + Sj + C[32:0]
        {C[32:0], Sj} = Sj + q[31:0] * Mj + C[32:0]
        Sj-1 = Sj[32:0.]
        Precompute next q = S0[31:0] * (232 − MINV 0),
``` where q is the reduction coefficient, X and Y are operands, M is a modulus, and S is a result of a cycle.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic comprised in circuitry for an encryption unit, the encryption unit coupled to the at least one memory, the logic to:
   precompute a reduction coefficient for a Rivest, Shamir, Adelman (RSA) encryption process with a Montgomery multiplication (MM) data path that incorporates look-ahead reduction coefficient computation,
   determine an operand product and a reduction product in parallel for the RSA encryption process, the reduction product based on the reduction coefficient, and
   generate a MM result for a parallel reduction multiplier (PRM) MM process in the RSA encryption process based on the operand product and the reduction product.

2. The apparatus of claim 1, comprising a PRM MM data path, at least a portion of the PRM MM data path comprised in hardware, coupled to the logic.

3. The apparatus of claim 2, the PRM MM data path comprising a 32-bit word-based data path.

4. The apparatus of claim 2, the PRM MM data path comprising a first multiplier and a second multiplier for determining the operand product and the reduction product in parallel.

5. The apparatus of claim 4 the first multiplier and the second multiplier comprising 32×32 word multipliers.

6. The apparatus of claim 2, the PRM MM data path comprising a precomputation block to precompute the reduction coefficient.

7. The apparatus of claim 1, the logic to precompute the reduction coefficient based on an intermediate MM result of a previous cycle of the PRM MM process.

8. The apparatus of claim 1, the logic to accumulate lower order partial products of a current cycle of the PRM MM process with higher order partial products of a previous cycle of the PRM MM process.

9. The apparatus of claim 1, the logic to store MM operands in a first-in-first-out (FIFO) element.

10. The apparatus of claim 1, the logic to precompute the reduction coefficient for an $i^{th}$ iteration of the PRM MM process based on intermediate result S from an $i-1^{th}$ iteration of the PRM MM process.

11. The apparatus of claim 1, the reduction product determined based on a lowermost word of an intermediate result of a previous cycle of the PRM MM process.

12. The apparatus of claim 1, the logic to precompute the reduction product every b/r cycles, where b is a bit-width of MM operands and r is an MM radix.

13. A non-transitory computer-readable storage medium that stores instructions for execution by processing circuitry of a computing device to perform an encryption process, the instructions to cause the computing device to:
   precompute a reduction coefficient for a Rivest, Shamir, Adelman (RSA) encryption process with a Montgomery multiplication (MM) data path that incorporates look-ahead reduction coefficient computation;
   determine an operand product and a reduction product in parallel for the RSA encryption process, the reduction product based on the reduction coefficient; and
   generate a Montgomery multiplication (MM) result for a parallel reduction multiplier (PRM) MM process in the RSA encryption process based on the operand product and the reduction product.

14. The non-transitory computer-readable storage medium of claim 13, the instructions to cause the computing device to use a PRM MM data path for performing the PRM MM process.

15. The non-transitory computer-readable storage medium of claim 14, the PRM MM data path comprising a first multiplier and a second multiplier for determining the operand product and the reduction product in parallel.

16. The non-transitory computer-readable storage medium of claim 13, the instructions to cause the computing device to precompute the reduction coefficient based on an intermediate MM result of a previous cycle of the PRM MM process.

17. A method of encryption, the method comprising:
   precomputing a reduction coefficient for a Rivest, Shamir, Adelman (RSA) encryption process with a Montgomery multiplication (MM) data path that incorporates look-ahead reduction coefficient computation;
   determining an operand product and a reduction product in parallel for the RSA encryption process, the reduction product based on the reduction coefficient; and
   generating a Montgomery multiplier (MM) result for a parallel reduction multiplier (PRM) MM process in the RSA encryption process based on the operand product and the reduction product.

18. The method of claim 17, comprising using a PRM MM data path for performing the PRM MM process, the PRM MM data path comprising a first multiplier and a second multiplier for determining the operand product and the reduction product in parallel.

19. The method of claim 17, comprising precomputing the reduction coefficient based on an intermediate MM result of a previous cycle of the PRM MM process.

* * * * *